US011677317B2

United States Patent
Yokota et al.

(10) Patent No.: US 11,677,317 B2
(45) Date of Patent: Jun. 13, 2023

(54) CONTROL DEVICE

(71) Applicant: AISIN CORPORATION, Aichi (JP)

(72) Inventors: Masaki Yokota, Kariya (JP); Motofumi Miyake, Kariya (JP); Hiroaki Takahashi, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/718,446

(22) Filed: Apr. 12, 2022

(65) Prior Publication Data
US 2022/0385181 A1    Dec. 1, 2022

(30) Foreign Application Priority Data

May 28, 2021  (JP) .............................. JP2021-090507

(51) Int. Cl.
*H02M 1/36* (2007.01)
*H02M 3/155* (2006.01)

(52) U.S. Cl.
CPC .................................. *H02M 3/155* (2013.01)

(58) Field of Classification Search
None
See application file for complete search history.

(56) References Cited

U.S. PATENT DOCUMENTS 11,475,963 B2 *  10/2022  Yoshida ............. G11C 16/3427
2022/0145674 A1 *  5/2022  Koizumi ................. G07C 9/22

FOREIGN PATENT DOCUMENTS

WO    2014/203501 A1    12/2014

* cited by examiner

*Primary Examiner* — Jeffery S Zweizig
(74) *Attorney, Agent, or Firm* — Sughrue Mion, PLLC

(57) ABSTRACT

A control device includes a control IC that receives power supply from a power source unit activated by a first signal, and that is configured to control driving of the power source unit, a first signal acquisition unit configured to acquire the first signal, a detection unit configured to detect rising and falling of the first signal, a second signal output unit configured to output a second signal when the falling of the first signal is detected by the detection unit, and a lowering unit configured to lower, according to the second signal output from the second signal output unit, a voltage value of a terminal of the power source unit, to which the first signal is to be input, to a predetermined value or less for a predetermined period of time set in advance.

8 Claims, 2 Drawing Sheets

CONTROL DEVICE

CROSS REFERENCE TO RELATED APPLICATIONS

This application is based on and claims priority under 35 U.S.C. § 119 to Japanese Patent Application 2021-090507, filed on May 28, 2021, the entire content of which is incorporated herein by reference.

TECHNICAL FIELD

This disclosure relates to a control device that includes a control IC that receives power supply from a power source unit activated by a first signal as a trigger, and controls driving of the power source unit by the control IC.

BACKGROUND DISCUSSION

In the related art, an electronic control device including a control unit and a power supply unit that supplies power to the control unit has been used. As such an electronic control device, for example, there is an electronic control device described in WO 2014/203501 (Reference 1).

Reference 1 discloses an electronic control device. The electronic control device includes a control unit, a power supply unit, and a monitoring unit. The power supply unit supplies power to the control unit and stops the power supply. The monitoring unit monitors an operation of the control unit, starts measuring a time when a clear signal is output from the control unit, and resets the control unit when the measured time reaches a preset value. The control unit outputs the clear signal to the monitoring unit when a stop condition for the power supply from the power supply unit is not satisfied, and outputs the stop signal to the monitoring unit when the stop condition for the power supply from the power supply unit is satisfied. When the clear signal is output, the monitoring unit clears the measured time and starts measuring a new time, and when the stop signal is output, the monitoring unit stops the power supply from the power supply unit.

In the technique described in Reference 1, based on signals (the clear signal and the stop signal) output from the control unit, the measured time is cleared, and the time until the power supply of the power supply unit is stopped is delayed. When measuring the time or delaying the time until the power supply of the power supply unit is stopped, it is necessary to provide a functional unit in the electronic control device, and thus it is necessary to improve the performance of the electronic control device as compared with a case where the functional unit is not provided. This causes an increase in cost.

A need thus exists for a control device which is not susceptible to the drawback mentioned above.

SUMMARY

According to a characteristic configuration of a control device according to this disclosure, the control device includes: a control IC that receives power supply from a power source unit activated by a first signal as a trigger, and that is configured to control driving of the power source unit; a first signal acquisition unit provided in the control IC and configured to acquire the first signal; a detection unit provided in the control IC and configured to detect rising and falling of the first signal; a second signal output unit provided in the control IC and configured to output a second signal when the falling of the first signal is detected by the detection unit; and a lowering unit configured to lower, according to the second signal output from the second signal output unit, a voltage value of a terminal of the power source unit, to which the first signal is to be input, to a predetermined value or less for a predetermined period of time set in advance.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A control device disclosed here includes a control IC, and is configured to control driving of a power source unit by the control IC. Hereinafter, a control device 1 according to the present embodiment will be described.

Figure 1:
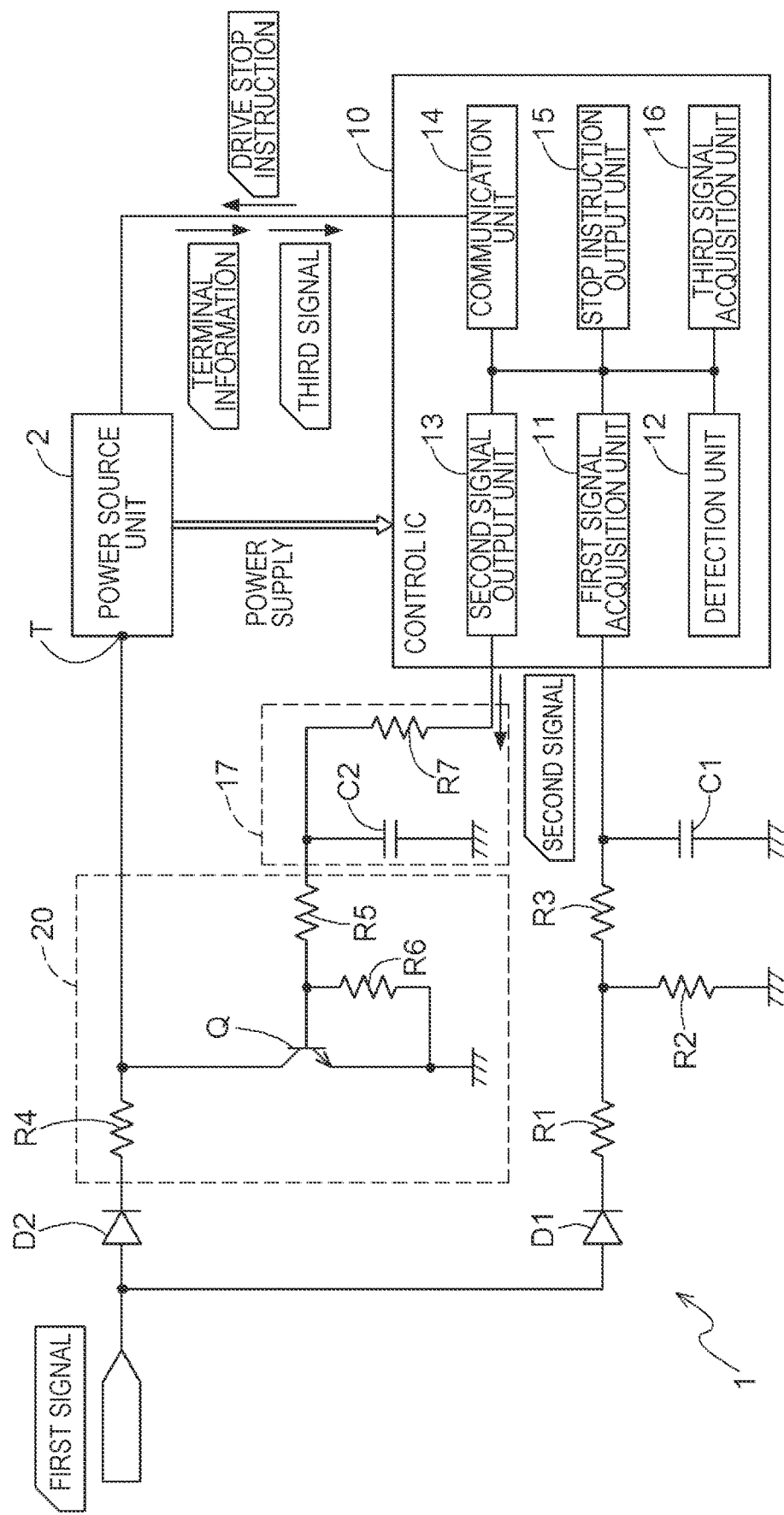
FIG. 1 is a block diagram showing a configuration of a control device.
Figure 2:
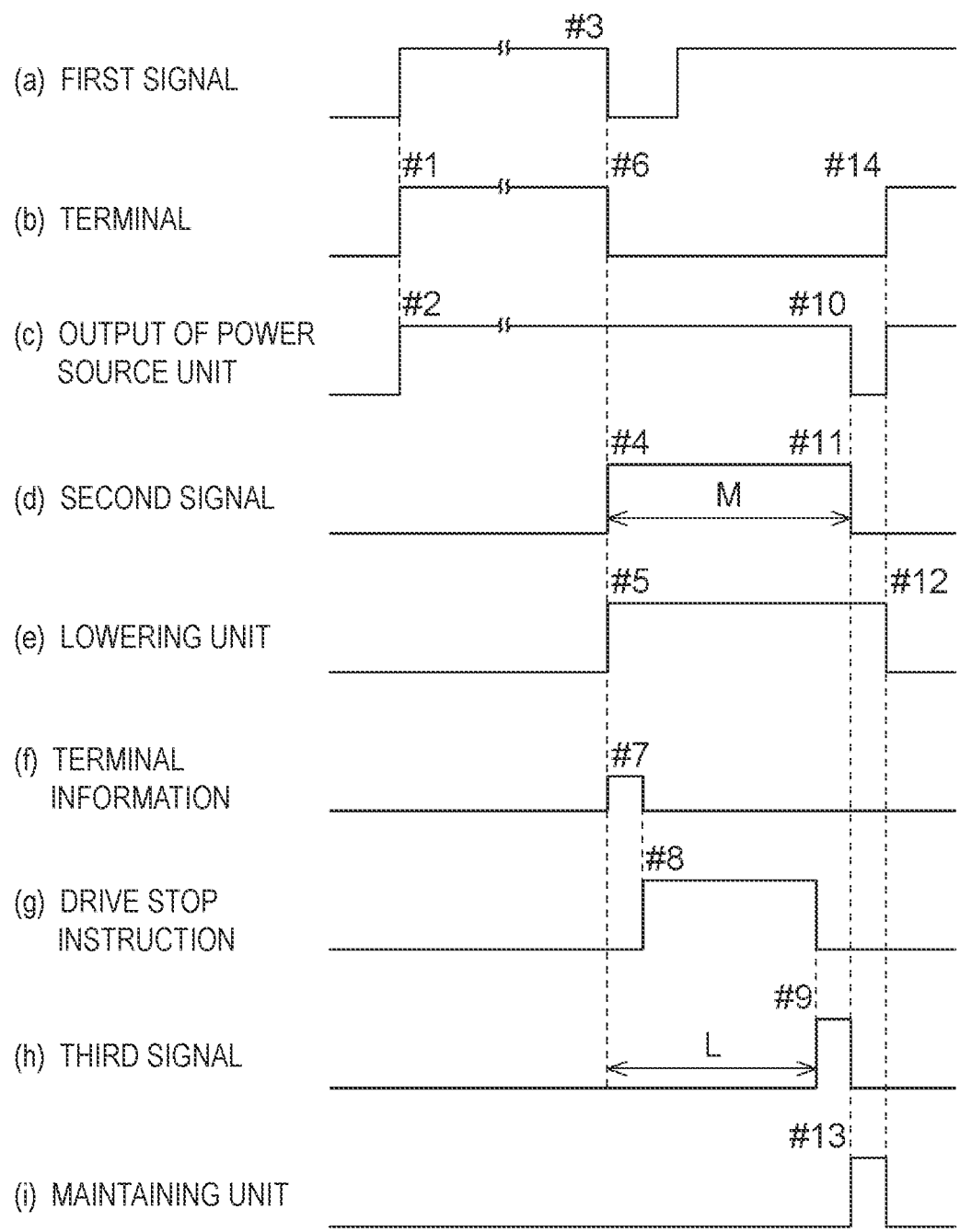
FIG. 2 is a timing chart showing processing of the control device.

FIG. 1 is a block diagram schematically showing a configuration of the control device 1. FIG. 2 is a timing chart showing processing of the control device 1. As shown in FIG. 1, the control device 1 includes a control IC 10, a maintaining unit 17, and a lowering unit 20. The control IC 10 includes a first signal acquisition unit 11, a detection unit 12, a second signal output unit 13, a communication unit 14, a stop instruction output unit 15, and a third signal acquisition unit 16. Each functional unit is implemented by hardware, software, or both of hardware and software using a CPU as a core member in order to perform processing related to control of driving of a power source unit 2.

Power is supplied to the control IC 10 from the power source unit 2 activated by a first signal as a trigger. Although not shown in FIG. 1, the power source unit 2 includes a DC/DC converter that lowers an input voltage to a voltage having a predetermined voltage value. A voltage generated by the power source unit 2 is applied to the control IC 10. On the other hand, as shown in FIG. 2, the power source unit 2 is activated (#1) when, for example, a first signal from a host system is input to a terminal T, and generates and outputs the above-described voltage (#2). The power source unit 2 is activated by the first signal as a trigger in this manner, and the driving of the power source unit 2 is controlled by the control IC 10 particularly after the activation. The power source unit 2 may be a DC/DC converter that boosts the input voltage to a voltage having a predetermined voltage value.

The first signal acquisition unit 11 acquires the first signal. The first signal is divided based on respective resistance values of a resistor R1 and a resistor R2 via a backflow prevention diode D1. The divided first signal is input to the first signal acquisition unit 11 via a filter including a resistor R3 and a capacitor C1. The first signal is also input to the terminal T of the power source unit 2 described above via a diode D2 and a resistor R4. The first signal acquired by the first signal acquisition unit 11 is transmitted to the detection unit 12 to be described later.

The detection unit 12 detects rising and falling of the first signal. The detection unit 12 may detect rising and falling of the first signal based on a change (for example, a gradient) in voltage of the first signal, or may detect rising and falling of the first signal based on the voltage value of the first signal. A detection result of the detection unit 12 is transmitted to the second signal output unit 13 to be described later.

The second signal output unit 13 outputs a second signal when the falling of the first signal is detected by the detection unit 12. As described above, the rising and the falling of the first signal are detected by the detection unit 12, and the detection result is transmitted to the second signal output unit 13. When the detection result from the detection unit 12 indicates the falling of the first signal (#3), the second signal output unit 13 outputs the second signal (#4). In the present embodiment, the second signal is transmitted to the lowering unit 20 via the maintaining unit 17 to be described later.

In response to the second signal output from the second signal output unit 13, the lowering unit 20 lowers the voltage value of the terminal T of the power source unit 2, to which the first signal is to be input, to a predetermined value or less for a predetermined period of time set in advance. Although details will be described later, the predetermined period of time is a time from when the falling of the first signal is detected to at least when the restart is possible after the power source unit 2 stops the output. In the present embodiment, the lowering unit 20 includes a transistor Q, a resistor R5, a resistor R6, and the resistor R4 described above. In the present embodiment, an npn-type bipolar transistor is used as the transistor Q. The resistor R5 is provided between a base terminal of the transistor Q and the second signal output unit 13, and functions as a base resistor. The resistor R6 is provided between the base terminal and an emitter terminal of the transistor Q. The emitter terminal of the transistor Q is grounded, and a collector terminal thereof is connected to the terminal T. The resistor R4 prevents an overcurrent from flowing through the diode D2. Therefore, the lowering unit 20 operates in response to the second signal from the second signal output unit 13 (#5), and lowers the voltage value of the terminal T to the predetermined value or less (ideally a ground potential in the example of FIG. 1) (#6), that is, the lowering unit 20 latches the terminal T to a Low potential (Low latch) in response to the second signal from the second signal output unit 13.

The communication unit 14 communicates with the power source unit 2 at a preset time interval. Communication at a preset time interval means communication in synchronization with a clock signal oscillating at a predetermined frequency. As such a communication method, for example, serial peripheral interface (SPI) communication is used. Therefore, the communication unit 14 communicates with the power source unit 2 in synchronization with a clock signal oscillating at a predetermined frequency. Of course, the communication unit 14 may perform communication by another communication method.

Such communication allows not only information to be transmitted from the control IC 10 to the power source unit 2, but also information to be transmitted from the power source unit 2 to the control IC 10. As described above, when the voltage value of the terminal T is equal to or less than the predetermined value, in the present embodiment, terminal information indicating that the voltage value of the terminal T is equal to or less than the predetermined value is transmitted from the power source unit 2 to the control IC 10 (#7).

When the falling of the first signal is detected by the detection unit 12 and the communication unit 14 acquires the terminal information from the power source unit 2, the stop instruction output unit 15 outputs, via the communication unit 14, a drive stop instruction to cause the power source unit 2 to stop the power supply. The stop instruction output unit 15 can detect based on the detection result of the detection unit 12 that the first signal has fallen. The terminal information from the power source unit 2 is transmitted to the communication unit 14. When the stop instruction output unit 15 acquires the detection result indicating that the first signal has fallen from the detection unit 12 and the terminal information from the power source unit 2, the stop instruction output unit 15 outputs, via the communication unit 14, a drive stop instruction to cause the power source unit 2 to stop the power supply (#8).

In the present embodiment, when the power source unit 2 acquires the drive stop instruction from the control IC 10, the power source unit 2 outputs a third signal to the control IC 10 (#9). The third signal acquisition unit 16 acquires such a third signal via the communication unit 14. The power source unit 2 stops output of the generated voltage when the power source unit 2 outputs the third signal (#10). Accordingly, the power supply to the control IC 10 is stopped. Therefore, output of the second signal from the second signal output unit 13 is stopped (#11).

Here, it has been described that the lowering unit 20 lowers the voltage value of the terminal T to the predetermined value or less for a predetermined period of time set in advance. It is preferable that the predetermined period of time is set to be longer than a period of time from when the falling of the first signal is detected by the detection unit 12 to when the third signal acquisition unit 16 acquires the third signal. That is, in the example of FIG. 2, it is preferable that the second signal output unit 13 outputs the second signal for a time M which is indicated by #4 to #11, longer than a time L from a time point at which the falling of the first signal is detected by the detection unit 12, which is indicated by #3, to a time point at which the third signal acquisition unit 16 acquires the third signal, which is indicated by #9. Accordingly, the lowering unit 20 can lower the voltage value of the terminal T to the predetermined voltage value or less for the time M longer than the time L (#5 to #11).

When the power supply from the power source unit 2 to the control IC 10 is stopped (#10), the second signal output unit 13 stops output of the second signal (#11). When the second signal output unit 13 stops output of the second signal, the maintaining unit 17 causes the lowering unit 20 to maintain the voltage value of the terminal T at the predetermined value or less for a predetermined period of time. In the present embodiment, the maintaining unit 17 is provided between the second signal output unit 13 and the lowering unit 20, and is configured to delay the falling of the second signal from the second signal output unit 13. Specifically, the maintaining unit 17 includes a resistor R7 provided between the second signal output unit 13 and the resistor R5, and a capacitor C2 provided between a node of the resistor R7 and the resistor R5 and the ground potential. Accordingly, the capacitor C2 is charged by the second signal, and after the second signal falls, the lowering unit 20 can be operated by using a charge charged in the capacitor C2 (#12, #13). Therefore, after the second signal falls (#11), the voltage value of the terminal T can be maintained at the predetermined value or less for a predetermined period of time (#14).

With the above configuration, the control IC 10 included in the control device 1 can appropriately control the driving of the power source unit 2.

Other Embodiments

In the above embodiment, the control device 1 includes the communication unit 14, the stop instruction output unit 15, and the third signal acquisition unit 16. Alternatively the communication unit 14, the stop instruction output unit 15, and the third signal acquisition unit 16 may be omitted.

In the above embodiment, the control device 1 includes the maintaining unit 17. Alternatively, the control device 1 may not include the maintaining unit 17.

In the above embodiment, the second signal output unit 13 outputs the second signal when the detection unit 12 detects the falling of the first signal. Alternatively, the second signal output unit 13 may stop output of the second signal when the rising of the first signal is detected by the detection unit 12 during a predetermined period of time. Accordingly, when the first signal is input to the power source unit 2 again, the power source unit 2 can be restarted by the input of the first signal.

According to this disclosure, it is possible to use a control device including a control IC that receives power supply from a power source unit activated by a first signal as a trigger, and that is configured to control driving of the power source unit.

According to a characteristic configuration of a control device according to this disclosure, the control device includes: a control IC that receives power supply from a power source unit activated by a first signal as a trigger, and that is configured to control driving of the power source unit; a first signal acquisition unit provided in the control IC and configured to acquire the first signal; a detection unit provided in the control IC and configured to detect rising and falling of the first signal; a second signal output unit provided in the control IC and configured to output a second signal when the falling of the first signal is detected by the detection unit; and a lowering unit configured to lower, according to the second signal output from the second signal output unit, a voltage value of a terminal of the power source unit, to which the first signal is to be input, to a predetermined value or less for a predetermined period of time set in advance.

According to such a characteristic configuration, by lowering the voltage value of the terminal of the power source unit, to which the first signal is to be input, to the predetermined value or less in response to the falling of the first signal, it is possible to reliably restart the power source unit in response to the input of the next first signal. In addition, since the control IC only needs to output the second signal to the lowering unit in response to the falling of the first signal, the control IC does not need a high-performance arithmetic processing ability. Therefore, according to the present control device, it is possible to realize reliable restart of the power source unit with an inexpensive configuration.

The second signal output unit may stop output of the second signal when the rising of the first signal is detected by the detection unit during the predetermined period of time.

According to such a configuration, when the rising of the first signal is detected in a state in which the lowing unit lowers the voltage value of the terminal of the power source unit, to which the first signal is to be input, to the predetermined value or less by the falling of the first signal, the function of the lowing unit of lowering the voltage value of the terminal of the power source unit, to which the first signal is to be input, to the predetermined value or less can be stopped. Therefore, the first signal can be input to the terminal of the power source unit.

The control device further includes: a communication unit provided in the control IC and configured to communicate with the power source unit at a preset time interval; a stop instruction output unit provided in the control IC, and configured to output, via the communication unit, a drive stop instruction to cause the power source unit to stop the power supply when the falling of the first signal is detected by the detection unit and the communication unit acquires, from the power source unit terminal information indicating that the voltage value of the terminal is equal to or less than the predetermined value; and a third signal acquisition unit provided in the control IC and configured to acquire, via the communication unit, a third signal output when the power source unit acquires the drive stop instruction, in which the predetermined period of time may be set to be longer than a period of time from when the falling of the first signal is detected by the detection unit to when the third signal acquisition unit acquires the third signal.

With such a configuration, it is possible to maintain a state in which the voltage value of the terminal of the power source unit, to which the first signal is to be input, is lowered to the predetermined value or less at least until the third signal is acquired after the falling of the first signal is detected. Therefore, it is possible to reliably restart the power source unit in response to the input of the next first signal.

When the power supply from the power source unit to the control IC is stopped, the second signal output unit may stop output of the second signal. The control device may further include a maintaining unit configured to cause the lowering unit to maintain the voltage value of the terminal at the predetermined value or less for the predetermined period of time when the second signal output unit stops output of the second signal.

With such a configuration, after the control IC stops the driving of the power source unit by the communication with the power source unit, the state in which the voltage value of the terminal of the power source unit, to which the first signal is to be input, is lowered to the predetermined value or less can be continued for a while.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A control device, comprising:
a control IC that receives power supply from a power source unit activated by a first signal as a trigger, and that is configured to control driving of the power source unit;
a first signal acquisition unit provided in the control IC and configured to acquire the first signal;
a detection unit provided in the control IC and configured to detect rising and falling of the first signal;
a second signal output unit provided in the control IC and configured to output a second signal when the falling of the first signal is detected by the detection unit; and
a lowering unit configured to lower, according to the second signal output from the second signal output unit, a voltage value of a terminal of the power source unit, to which the first signal is to be input, to a predetermined value or less for a predetermined period of time set in advance.

2. The control device according to claim 1, wherein the second signal output unit stops output of the second signal when the rising of the first signal is detected by the detection unit during the predetermined period of time.

3. The control device according to claim 1, further comprising:
a communication unit provided in the control IC and configured to communicate with the power source unit at a preset time interval;
a stop instruction output unit provided in the control IC, and configured to output, via the communication unit, a drive stop instruction to cause the power source unit to stop the power supply when the falling of the first signal is detected by the detection unit and the communication unit acquires, from the power source unit, terminal information indicating that the voltage value of the terminal is equal to or less than the predetermined value; and
a third signal acquisition unit provided in the control IC and configured to acquire, via the communication unit, a third signal output when the power source unit acquires the drive stop instruction, wherein
the predetermined period of time is set to be longer than a period of time from when the falling of the first signal is detected by the detection unit to when the third signal acquisition unit acquires the third signal.

4. The control device according to claim 2, further comprising:
a communication unit provided in the control IC and configured to communicate with the power source unit at a preset time interval;
a stop instruction output unit provided in the control IC, and configured to output, via the communication unit, a drive stop instruction to cause the power source unit to stop the power supply when the falling of the first signal is detected by the detection unit and the communication unit acquires, from the power source unit, terminal information indicating that the voltage value of the terminal is equal to or less than the predetermined value; and
a third signal acquisition unit provided in the control IC and configured to acquire, via the communication unit, a third signal output when the power source unit acquires the drive stop instruction, wherein
the predetermined period of time is set to be longer than a period of time from when the falling of the first signal is detected by the detection unit to when the third signal acquisition unit acquires the third signal.

5. The control device according to claim 1, wherein
when the power supply from the power source unit to the control IC is stopped, the second signal output unit stops output of the second signal, the control device further comprising:
a maintaining unit configured to cause the lowering unit to maintain the voltage value of the terminal at the predetermined value or less for the predetermined period of time when the second signal output unit stops output of the second signal.

6. The control device according to claim 2, wherein
when the power supply from the power source unit to the control IC is stopped, the second signal output unit stops output of the second signal, the control device further comprising:
a maintaining unit configured to cause the lowering unit to maintain the voltage value of the terminal at the predetermined value or less for the predetermined period of time when the second signal output unit stops output of the second signal.

7. The control device according to claim 3, wherein
when the power supply from the power source unit to the control IC is stopped, the second signal output unit stops output of the second signal, the control device further comprising:
a maintaining unit configured to cause the lowering unit to maintain the voltage value of the terminal at the predetermined value or less for the predetermined period of time when the second signal output unit stops output of the second signal.

8. The control device according to claim 4, wherein
when the power supply from the power source unit to the control IC is stopped, the second signal output unit stops output of the second signal, the control device further comprising:
a maintaining unit configured to cause the lowering unit to maintain the voltage value of the terminal at the predetermined value or less for the predetermined period of time when the second signal output unit stops output of the second signal.

* * * * *